United States Patent
Lu et al.

(10) Patent No.: US 7,471,951 B2
(45) Date of Patent: Dec. 30, 2008

(54) SIGNALING OF MULTI-TASK CALLS CARRIED BY A HYBRID CIRCUIT/PACKET NETWORK

(75) Inventors: Hui-Lan Lu, Marlboro, NJ (US); ZhongJin Yang, Naperville, IL (US); Jie Yao, Naperville, IL (US)

(73) Assignee: Alcatel-Lucent USA, Inc., Murray Hill, NJ (US)

( * ) Notice: Subject to any disclaimer, the term of this patent is extended or adjusted under 35 U.S.C. 154(b) by 1061 days.

(21) Appl. No.: 10/407,348

(22) Filed: Apr. 4, 2003

(65) Prior Publication Data

US 2004/0196831 A1 Oct. 7, 2004

(51) Int. Cl.
*H04Q 7/20* (2006.01)

(52) U.S. Cl. .................. 455/450; 455/451; 455/452.1; 455/452.2; 370/352; 726/3

(58) Field of Classification Search ...... 455/450–452.2; 370/352; 726/3
See application file for complete search history.

(56) References Cited

U.S. PATENT DOCUMENTS

| 5,610,910 | A * | 3/1997 | Focsaneanu et al. | 370/351 |
| 6,728,238 | B1 * | 4/2004 | Long et al. | 370/352 |
| 6,862,451 | B1 * | 3/2005 | Alard | 455/450 |
| 6,876,849 | B2 * | 4/2005 | Yang | 455/416 |
| 2001/0030956 | A1 * | 10/2001 | Chillariga et al. | 370/348 |
| 2003/0186705 | A1 * | 10/2003 | Lahav et al. | 455/451 |
| 2006/0023696 | A1 * | 2/2006 | Berger et al. | 370/352 |

* cited by examiner

*Primary Examiner*—Quynh H Nguyen

(57) ABSTRACT

A method and apparatus for establishing additional channels for a call between multi-task user terminals. A multi-task call (MTC) signaling module is used to receive requests for the addition or release of additional channels for a call. Through a signaling network, the module has access to the switches of a hybrid network for interconnecting edge switches connectable to MTC terminals. The MTC signaling module controls establishment or release of the connections between links of the paths through the hybrid network. Advantageously, an MTC terminal through its MTC signaling module can control the addition or release of channels through the hybrid network.

6 Claims, 5 Drawing Sheets

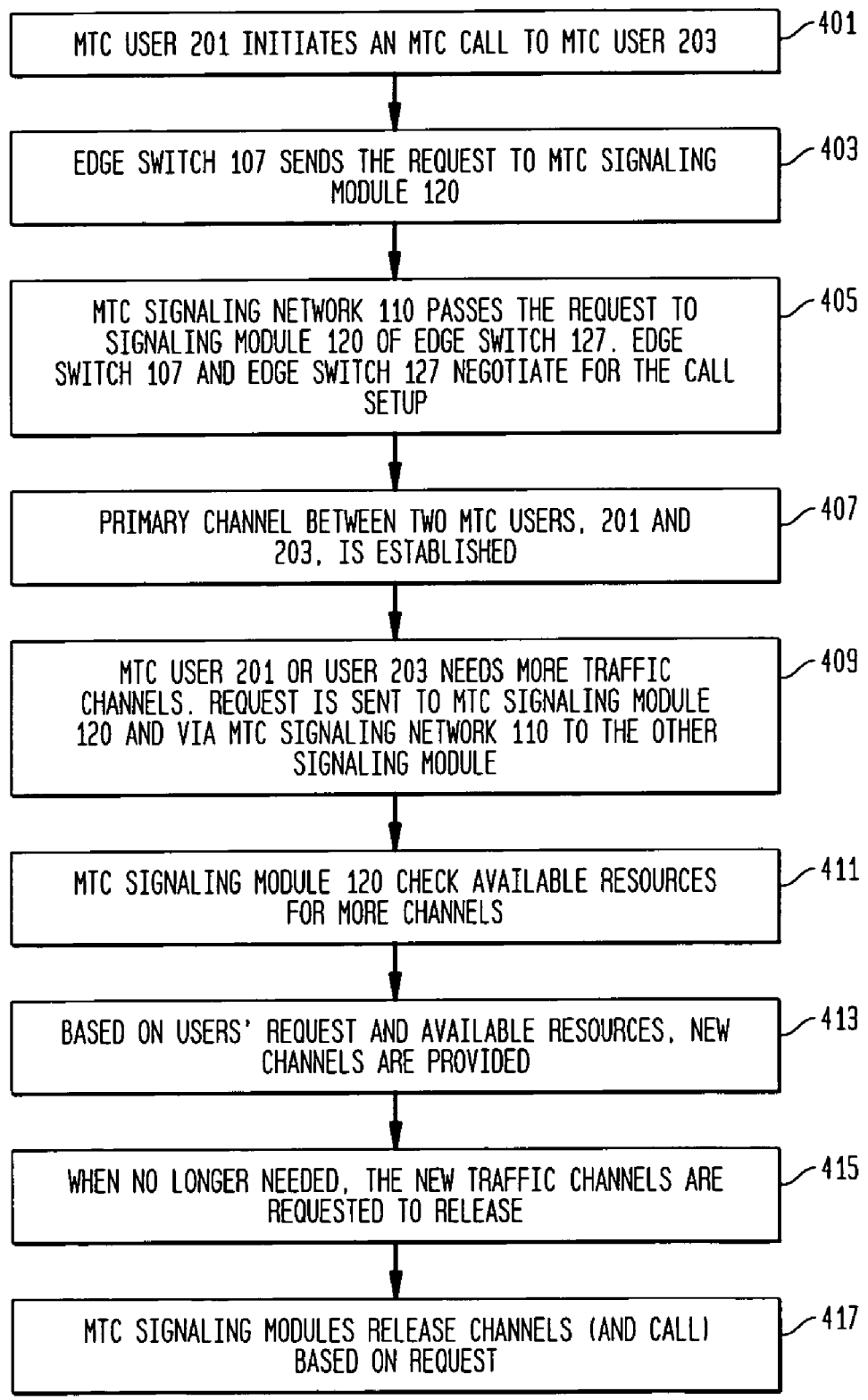

SIGNALING OF MULTI-TASK CALLS CARRIED BY A HYBRID CIRCUIT/PACKET NETWORK

TECHNICAL FIELD

This invention relates to signaling for hybrid networks, i.e., telecommunications networks that carry both packetized data signals and circuit switched signals.

BACKGROUND OF THE INVENTION

The past two decades have seen the evolution of requirements for greater and greater flexibility in the carrying of telecommunications signals. These signals now include simple data, facsimile signals, voice signals, data representing still pictures, and moving picture data.

A hybrid network for carrying a variety of signals is described in U.S. Pat. No. 6,529,499. Such a network carries circuit type traffic (constant bit rate) and variable bit rate packet traffic. If the network is primarily an Internet Protocol (IP) network, constant bit traffic is carried over channels with priority to ensure that delay and jitter are kept in bounds.

At this time, the cost of transmission channels for carrying wider bandwidths still exceeds the cost of transmission channels for carrying narrowband data or voice. Frequently, however, what starts out as a voice call may be transformed into a call requiring the transmission of still or moving picture data, for example, as part of a sales effort. What is needed, but has not yet been provided in a satisfactory arrangement, is a system for flexibly augmenting, for example, a voice call with the transmission of picture data or bulk data. However, such arrangements are limited to establishment of calls having all the required facilities initially.

SUMMARY OF THE INVENTION

The above problem is solved and an advance is made over the teachings of the prior art in accordance with this invention wherein communications between two multi-task communicator terminals, such as personal computers having the capability of supporting a plurality of channels, are changeable in the middle of a call through the use of a multi-task communicator (MTC) signaling module connected to the switch serving an MTC terminal and an MTC signaling network having access to the switches of a hybrid network having at least some switches that are hybrid switches and can serve both circuit switched and packet switched traffic. The advantage of having a hybrid switch is if there is a need during the course of a call to add packet capability or to add circuit capability possibly with the reduction of the other type of capability that this can be done within the switch and further that the hybrid switch can reassign facilities connected to other hybrid switches to be packet facilities instead of circuit facilities or vice versa.

The hybrid network interconnects edge switches, the edge switches being the switches connectable to circuit terminals, packet terminals, or MTC terminals. Effectively, the hybrid network is like a toll network for interconnecting edge switches which serve the same function as local switches in a telephone network.

The MTC signaling module is the edge switch's control access to the hybrid network. The MTC signaling module is connected to a signaling network which has access to other MTC signaling modules and to the switches of the hybrid network. Through the access to switches of the hybrid network, the MTC signaling module can find the resources necessary for establishing additional channels in the hybrid network.

The MTC signaling modules at the two ends of the connection negotiate initially to determine which of the two shall act as the master and which will act as the slave. The distinction is that if the master and the slave have contradictory requests, the requests by the master will prevail. If there is no conflict then either MTC signaling module can find the resources necessary for establishing additional channels.

BRIEF DESCRIPTION OF THE DRAWING(S)

FIG. 6 is a flow diagram illustrating the operation of Applicants' invention.

DETAILED DESCRIPTION

Figure 1:
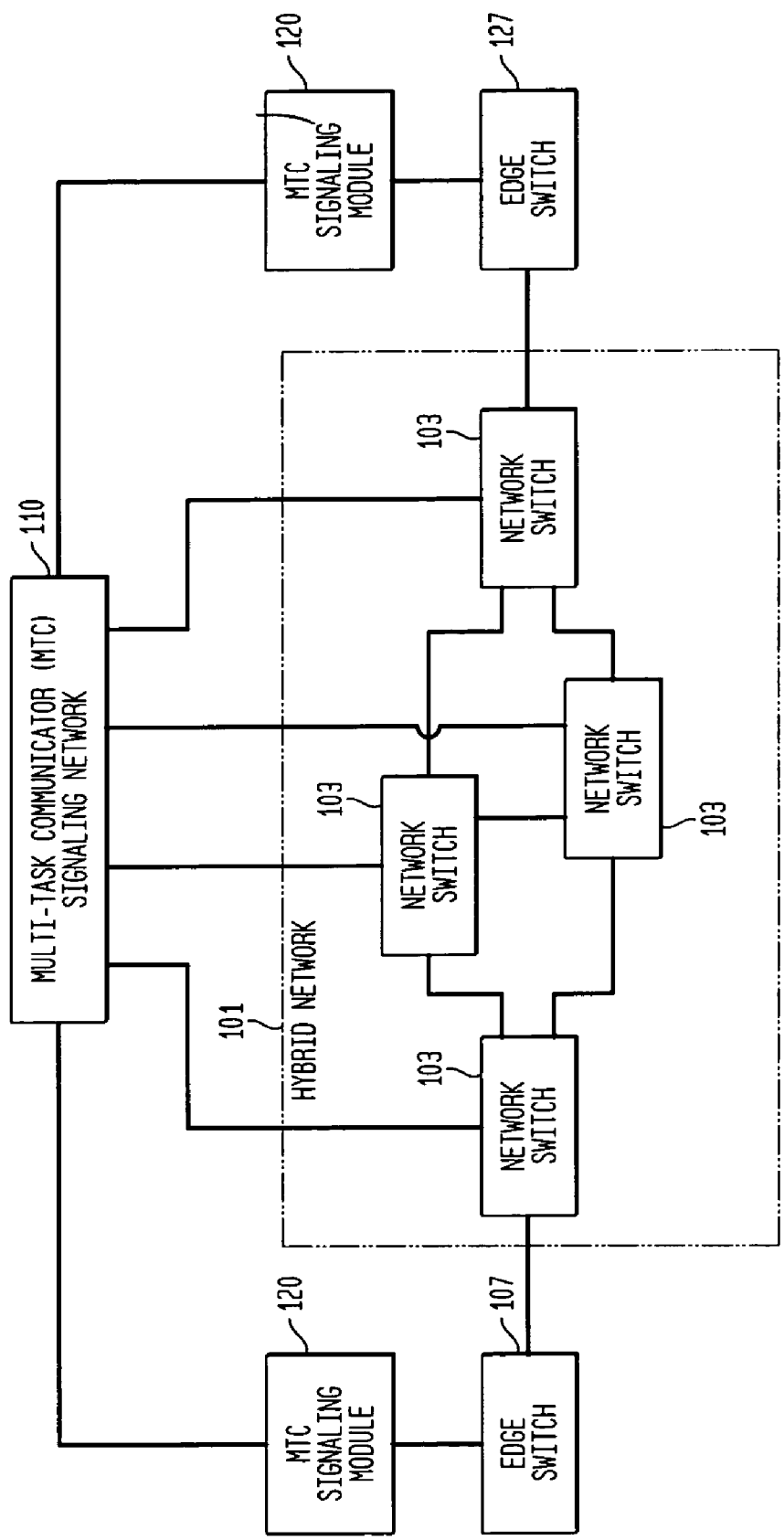
FIG. 1 is a block diagram of a hybrid network, the edge switches for accessing the hybrid network, and a signaling arrangement for controlling the hybrid network.

FIG. 1 is a block diagram illustrating the hybrid network, its signaling control, and the edge switches to which the hybrid network interconnects. The hybrid network is composed of network switches some of which are combined circuit and data switches and others of which may be pure circuit switches or pure data switches. The hybrid network 101 interconnects edge switches such as edge switch 107 and edge switch 127. The edge switches request calls and the allocation of resources in the hybrid network through the signaling network 110 and the controls of the signaling network which are a group of MTC signaling modules 120 each associated with an edge switch. When an edge switch needs to allocate additional resources it sends a request to its associated MTC signaling module which finds resources by accessing the various network switches using signaling network 110 and accesses a terminating edge switch such as edge switch 127 through the MTC signaling module 120 associated with that edge switch.

Figure 2:
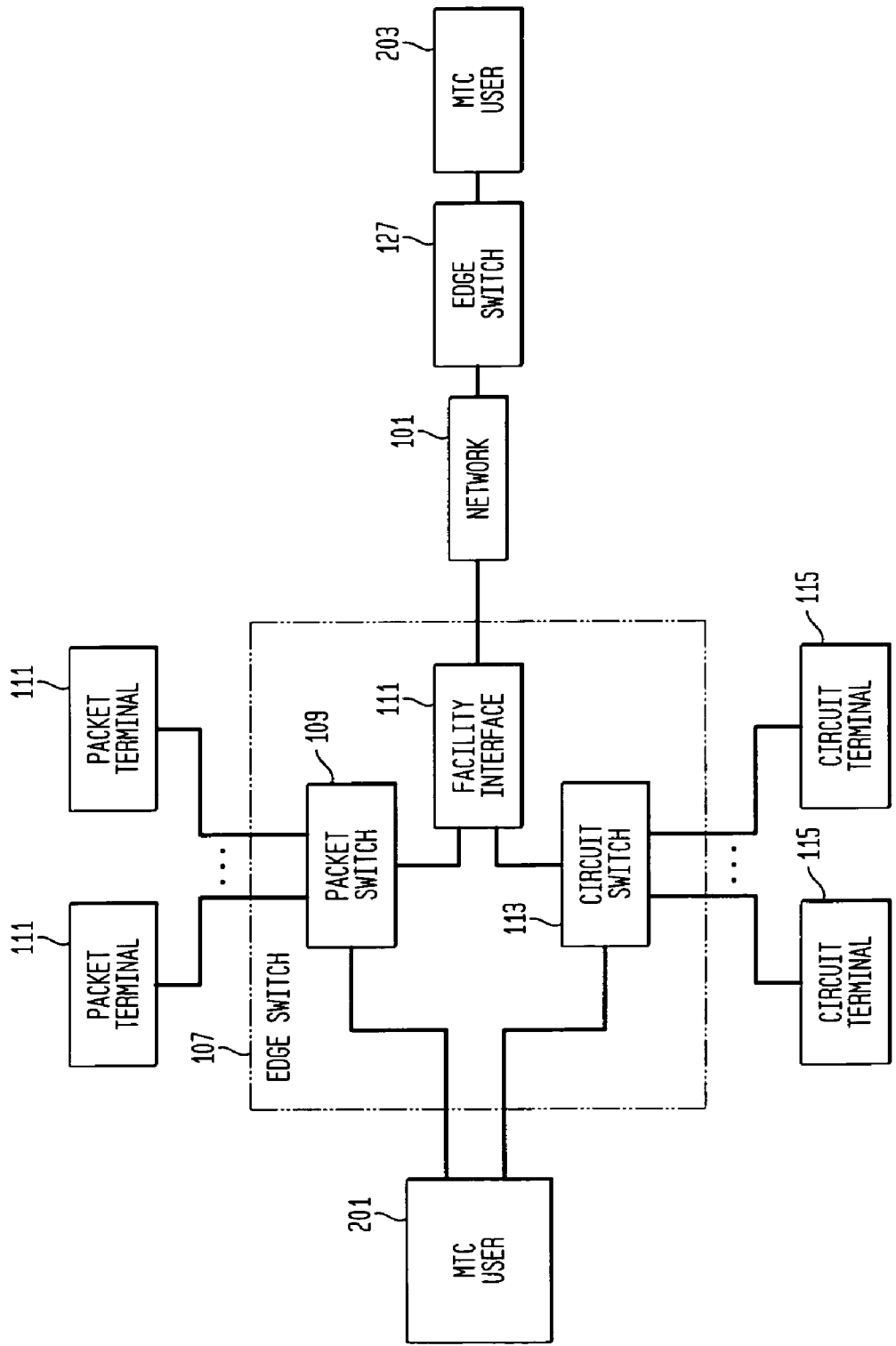
FIG. 2 shows details of the edge switch including a packet switch for dealing with packet terminals, a circuit switch for dealing with circuit terminals, and facilities for dealing with MTC terminals.

FIG. 2 shows details of the edge switch and its connection to the hybrid network 101. The edge switch is connected via a packet and data connection with an MTC user 201. It is also connected via a packet switch 109 to packet terminals 111 and via circuit switch 113 to circuit terminals 115. The packet switch and circuit switch are connected to network 101 via a facility interface 111.

Figure 3:
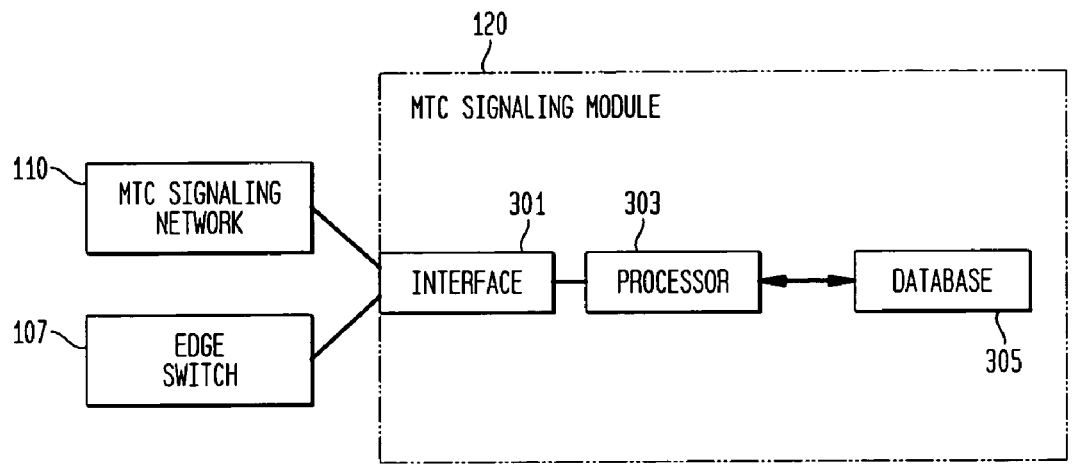
FIG. 3 shows the means for accessing the MTC signaling module from the signaling network and the edge switch, and shows the internal configuration of the MTC signaling module.

FIG. 3 shows the details of the MTC signaling module. The edge switch 107 or 127 is connected via an interface 301 to the MTC signaling module. The interface is needed when the MTC signaling module is not integrated into the edge switch, for example, if one MTC signaling module serves several edge switches. The edge switch provides the signaling module with a request for a connection. The MTC signaling module processes this requesting using processor 303 and data provided by database 305. The processor recognizes the need for resources in order to establish a requested connection and uses the MTC signaling network 110 to access the switches of hybrid network 101 in order to find the necessary resources for establishing the requested additional channel. The processor selects the appropriate resources, sends signaling requests over the signaling network 110 to the various switches of network 101 to establish the links of the requested channel. The data for the channel is then stored in database 305 so that the information is available for releasing these links when the channel is no longer needed. The database contains all real-time and non-real-time call records, and all network configuration data.

Figure 4:
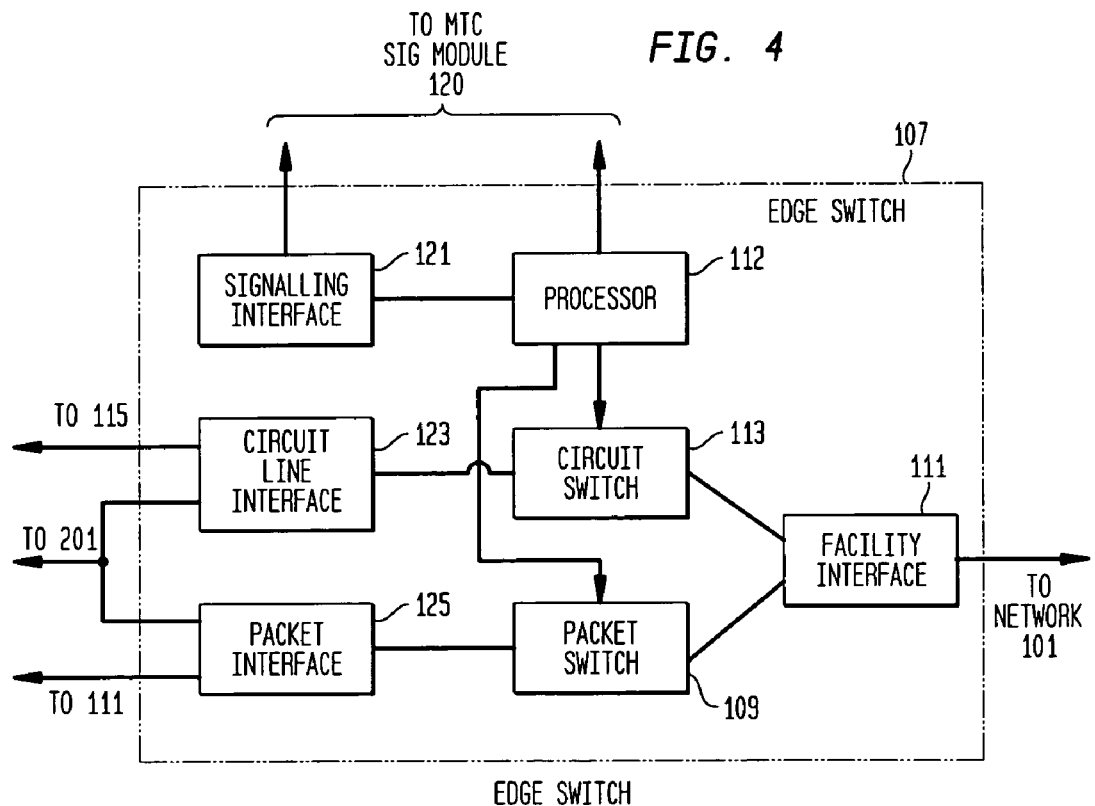
FIG. 4 is a block diagram of an edge switch.

FIG. 4 is a block diagram of an edge switch 107. The edge switch is controlled by a processor 112. A circuit interface 123 is connected to circuit terminals 115 and to MTC terminals 201. A packet interface 125 is connected to packet terminals 111 and to the MTC terminal 201. The circuit line interface 123 is connected to a circuit switch 113 and the packet interface 125 is connected to a packet switch 109. The packet switch and circuit switch are connected to a facility interface 111 which is connected to a facility such as a SONET facility for switching in the network 101. The SONET facility can carry circuit signals and packet signals.

The circuit and packet switch and facility interface are controlled by a processor 112 which communicates via signaling interface 121 to MTC signaling module 120.

Figure 5:
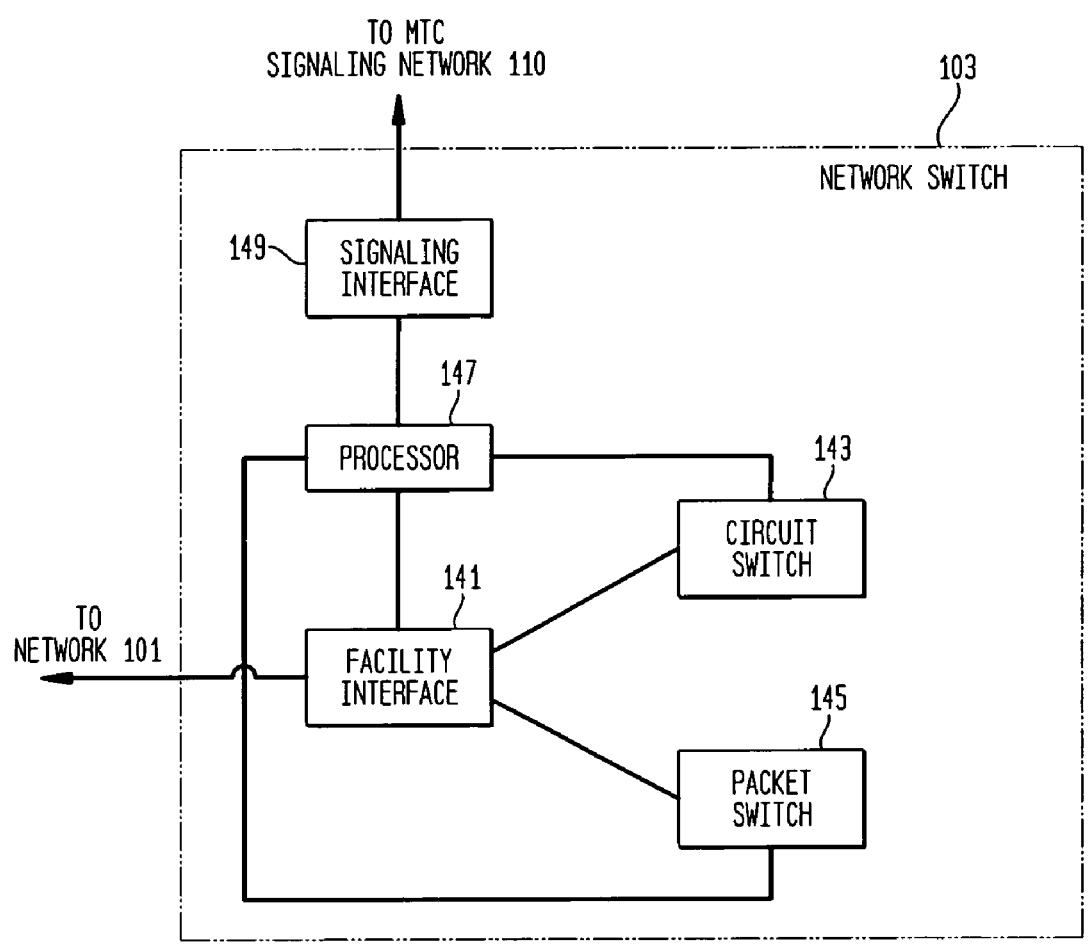
FIG. 5 is a block diagram of a network switch.

FIG. 5 is a block diagram of network switch 103. The switch is controlled by a processor 147 which controls a facility interface 141 that is connected to a circuit switch 143 and a packet switch 145. The circuit switch switches circuit signals received from the facility interface and the packet switch switches packet signals received from the facility interface. The facility interface 141 is connected to network 101 over a facility such as the well known SONET facility. The processor 147 is also connected to the signaling interface for transmitting signals to and receiving signals from the MTC signaling network 110.

FIG. 6 is a flow diagram illustrating the operation of Applicants' invention. First, MTC users such as MTC user 201 initiates an MTC call to another MTC user 203 (action block 401). Edge switch 107 (serving MTC user 201) sends the request to its associated MTC signaling module (action block 403). MTC signaling network 110 passes the request to the signaling module 120 of edge switch 127. Edge switch 107 and edge switch 127 then negotiate for the call setup (action block 405). A primary channel between the two MTC users 201 and 203 is established (action block 407) under the control of signaling modules 120 of edge switches 107 and 127 (action block 407). In general, one of the signaling modules 120 is associated with the originating the station while a second signaling module 120 is associated with the terminating station. In the case of a call between two mobile stations, either mobile station may request additional traffic channel by sending the request to the MTC signaling module of the requesting MTC user. This request is passed on via signaling network 110 to the signaling module of the other MTC user (action block 409). The request is sent to the MTC signaling module of the requesting MTC user and is passed on via signaling network 110 to the signaling module of the other MTC user (action block 409). The MTC signaling modules 120 then check for available resources for the requested additional channels (action block 411). Based on the user's request and the resources found available by the MTC signaling modules, new channels are provided and data for these new channels is stored in the MTC signaling modules (action block 413). When the new traffic channels are no longer needed, a request is generated by one of the MTC users to release the new traffic channels (action block 415). The MTC signaling modules release the new channels and eventually release the call based on these requests (action block 417).

The above description is of one preferred embodiment of Applicants' invention. Other embodiments will be apparent to those of ordinary skill in the art without departing from the scope of the invention. The invention is limited only by the attached claims.

We claim:

1. In a hybrid network comprising means for switching circuit traffic and packet traffic, a method for controlling allocation of an additional channel to a call between a first and a second multi-task call (MTC) terminal, comprising the steps of:
   during a call in progress sending a request for an additional channel from said first MTC terminal to a first multi-task communicator signaling module connected to a switch serving said first MTC terminal;
   responsive to receipt of the request, searching for a channel between said first and said second MTC terminal by using said first multi-task communicator signaling module, an MTC signaling network having access to the switches of said hybrid network and a second multi-task communicator signaling module connected to a switch serving said second MTC terminal and said second multi-task communicator signaling module; and
   said first and second multi-task communicator signaling modules responsive to information received from said switches of said network over said signaling network, selecting a channel in said hybrid network for being responsive to said request;
   sending signaling information over said signaling network to assign said channel to said call.

2. The method of claim 1 wherein said first and second multi-task communicator signaling modules store data for channels of said call.

3. The method of claim 1 wherein said first and second multi-task communicator signaling modules control the establishment of a call path in an edge switch for accessing switches of said hybrid network.

4. In a hybrid network comprising means for switching circuit traffic and packet traffic, apparatus for controlling allocation of an additional channel to a call between a first and a second multi-task call (MTC) terminal, comprising:
   a first multi-task communicator signaling module connected to a switch serving said first MTC terminal;
   means for sending a request for an additional channel from said first MTC terminal to said first multi-task communicator signaling module during a call in progress;
   a multi-task call (MTC) signaling network having access to the switches of a hybrid network, to said first multi-task communicator signaling module and to a second multi-task communicator signaling module connected to a switch serving said second MTC terminal;
   said first and second multi-task communicator signaling modules responsive to receipt of the request for searching for a channel between said first and said second MTC terminal using said MTC signaling network;

means responsive to information received from said switches of said network over said signaling network, for selecting a channel of said hybrid network for being responsive to said request; and means for sending signaling information over said signaling network to assign resources for said channel.

5. The apparatus of claim 4 wherein said first and second multi-task communicator signaling modules store data for channels of said call.

6. The apparatus of claim 4 wherein said first and second multi-task communicator signaling modules control the establishment of a call path in edge switches for accessing switches of said hybrid network from said MTC terminals.

* * * * *